W. R. PATTERSON.
Assignor to the WESTERN ELECTRIC COMPANY.
ELECTRIC CONDUCTOR.
No. 10,563. Reissued Feb. 24, 1885.
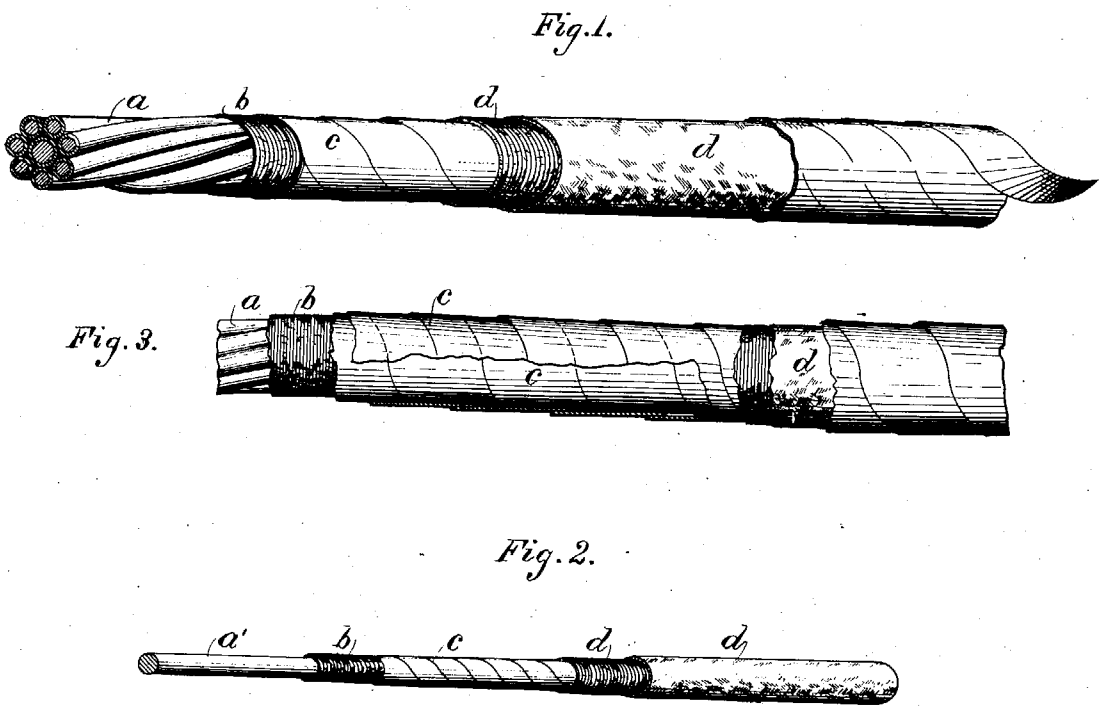
Witnesses.
H. Clay Fairbanks
Sam'l B. Dover
Inventor.
William R. Patterson.
By George P. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

ELECTRIC CONDUCTOR.

SPECIFICATION forming part of Reissued Letters Patent No. 10,563, dated February 24, 1885.

Original No. 306,513, dated October 14, 1884. Application for reissue filed November 24, 1884.

*To all whom it may concern:*

Be it known that I, WILLIAM RODNEY PATTERSON, a citizen of the United States, residing at Chicago, in the county of Cook and State of Illinois, have invented a certain new and useful Improvement in Insulating Electric Conductors, (Case 45,) of which the following is a full, clear, concise, and exact description, reference being had to the accompanying drawings, forming a part of this specification.

My invention relates to insulating electric conductors, and is especially useful as applied to electric-light wires, which should be flexible, and insulated by a covering which will not take fire.

My invention consists in covering the wire or core of conductors with a fibrous material, about which is wound one or more layers of lead tape lapped so as to break joints, and then covering the lead with a serving of jute or cotton, which serves to protect the lead tape from external injury. I find it of advantage to saturate the outside serving with fire-proof paint as a protection against fire. The serving, however, protects the lead tape adequately under ordinary conditions without the fire-proof paint. I apply shellac or paint to the joints of the lead tape, so as to render the covering of lead water-proof. I preferably wind a cloth tape about the fire-proof serving.

In Figure 1 of the drawings I have shown the manner of applying my invention to a core of conductors. In Fig. 2 I have shown a single wire provided with my fire-proof insulating-covering. Fig. 3 is a perspective view, showing a double covering of lead tape in detail.

The core *a* of insulated wires may be bunched together in any well-known way, and may consist of any number of conductors. A single wire, *a'*, may be used, if desired, as shown in Fig. 2.

The covering which I have invented consists of the combination of the fibrous covering *b*, next to the core or conductor, the covering of lead tape *c*, wound about said fibrous covering so as to lap or break joints, the joints or laps being preferably shellacked or painted. About the lead tape I provide a serving, *d*, of cotton or jute, which may be wound or braided thereon, preferably in two thicknesses, the first being wound, the second braided. The serving thus formed is (preferably) saturated with fire-proof paint.

As shown in Fig. 3, I have provided a double winding of lead tape, in order that moisture may not penetrate.

My cable as thus constructed is very flexible, and at the same time thoroughly insulated and fire-proof.

Cables thus formed are not designed for underground or subterranean uses, but for aerial uses; and for running circuits through buildings for electric-light purposes they are cheaper and better than any of the cables with which I am familiar, since they are light and flexible, and at the same time proof against moisture, and not liable to ignite and cause fires.

I claim—

1. The combination, with a flexible core or conducting-wire, of a fibrous covering, a lead-tape covering, and the fire-proof serving, substantially as and for the purpose specified.

2. The telegraph-cable which consists of a central core of one or more conductors and the covering of fibrous material *b*, the lapped lead tape, the joints being protected by shellac or paint, and the fire-proof serving, combined substantially as and for the purpose specified.

3. The combination, with a flexible core or conducting-wire, of a fibrous covering, the spirally-wound flexible lead-tape covering, the different convolutions of said lead-tape covering being lapped upon one another so as to break joints, and the serving, substantially as and for the purpose specified.

4. The telegraph-cable which consists of a central core of one or more conductors, the covering of fibrous material *b*, the lapped lead tape, the joints of the lead tape being protected by shellac or paint, and an outside serving to protect the lead tape, combined substantially as and for the purpose specified.

5. The combination, with a flexible core or conducting-wire, of a fibrous covering, the double spirally-wound flexible lead-tape covering, and the serving, substantially as and for the purpose specified.

In witness whereof I hereunto subscribe my name this 21st day of November, A. D. 1884.

WILLIAM R. PATTERSON.

Witnesses:
F. H. McCULLOCH,
GEORGE P. BARTON.